United States Patent Office 3,595,882
Patented July 27, 1971

3,595,882
PROCESS FOR PREPARING HALOGENATED
AMINE POLYEPOXIDES
Bart J. Bremmer, Midland, Mich., assignor to The
Dow Chemical Company, Midland, Mich.
No Drawing. Filed Oct. 24, 1968, Ser. No. 770,435
Int. Cl. C07d 1/04
U.S. Cl. 260—348.6
2 Claims

ABSTRACT OF THE DISCLOSURE

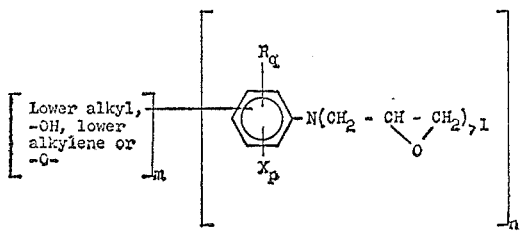

Wherein lower alkyl is alkyl of up to four carbon atoms; $m$ is an integer, zero or one; X is chloro or bromo; $p$ is an integer from 1 to $[5-(q+m)]$; R is a moiety

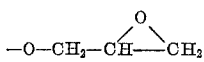

and $q$ is an integer, zero to two; and $n$ is one or two, and process for preparing the compounds which comprises reacting an amino aromatic compound with epichlorohydrin, with opening of the oxirane ring; halogenation, and ring closure.

BACKGROUND OF THE INVENTION

Field of the invention

Poly 1,2-(or $\alpha,\beta$)-polyepoxyalkyl compounds, having an average of more than one 1,2-epoxyalkyl group per molecule, and commonly called polyepoxides, broadly, and the present polyepoxides, in particular, are useful to be cured to obtain epoxy resins. Many important properties of the cured resins are related to structures other than the oxirane rings upon the reactivity of which the cure of the resins depends. For economy of production, it is desired to be able to produce polyepoxides from starting materials in considerable variety and to enjoy the benefits from certain unique properties of resins based upon a particular choice of starting materials.

The prior art 4,4′-methylene dianiline has long been known, as has aniline itself, as a curing agent for epoxy resins: although aniline has not been widely favored. Also, hydroxyalkyl adducts of amines, prepared by reacting an amine with an alkylene oxide in excess water, have been used as curing agents. A substance identified as an "aniline diglycidyl ether" has been used, at least experimentally, as a polyepoxide to be cured to obtain an epoxy resin. Resins and their polyepoxide precursors differing from some of these herein by only the absence of ring halogens are taught in U.S. Pat. 2,951,822.

SUMMARY OF THE PRESENT INVENTION

In the present invention, aniline, a lower alkyl aniline, lower alkylene dianiline or an aminophenol, any of them optionally ring substituted by epoxy lower alkoxy groups, is reacted with epichlorohydrin in excess, thereafter halogenated randomly, to a desired level of halogen content, and subsequently reacted with a halogen-accepting substance. The last step reconstitutes the oxirane ring, yielding 1,2-epoxy-3-propyl groups at sites of epichlorohydrin reaction, presently as nitrogen substituents.

The instant process is representatively illustrated by the following general course:

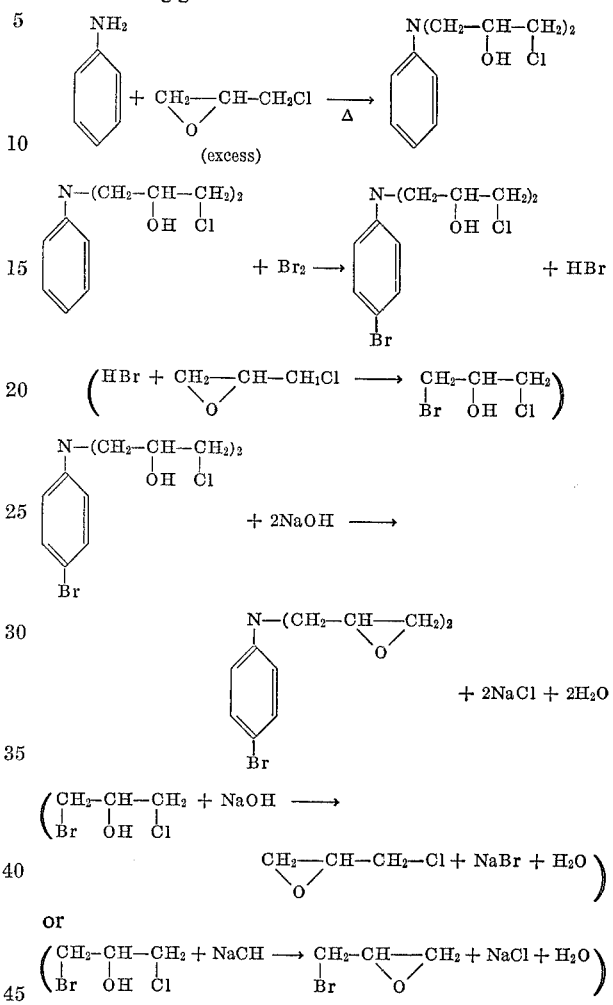

It will be recognized that the generalized equations that are parenthesized are, in general, concerned with the economy of the process and conservation of materials.

The course of reaction is closely parallel when starting with aniline, lower alkylene dianiline, aniline ar-glycidyl ethers, and lower alkylene dianiline glycidyl ethers, any of them.

Thus in a generalized chemical formula, the present invention is in chemical compounds of the formula

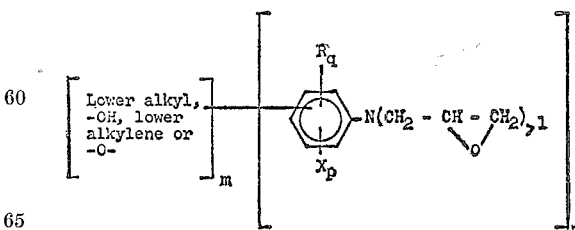

wherein lower alkyl is alkyl of up to four carbon atoms; $m$ is an integer, zero or one; X is chloro or bromo; $p$ is an integer from 1 to $[5-(q+m)]$; R is a moiety

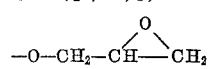

and $q$ is an integer, zero to two; and $n$ is one or two, and in a novel process for preparing the compounds which comprises reacting an amino aromatic compound with epichlorohydrin, with opening of the oxirane ring; halogenation and ring closure.

Now examining the invention in more detail, the starting aromatic amine is any substance having one or more essentially unhindered primary amino groups per molecule, bonded to an aromatic nucleus. The aromatic nucleus must have at least one hydrogen attached to it and replaceable by halogenation and may have up to five such sites per aromatic ring. Other substituents can be of great variety. It is contemplated that the usual substituents present in starting materials will be lower alkylene groups such as the bridges bonding together the several rings in bisphenol structures, and optionally also glycidyl etherifying groups; i.e. 1,2-epoxypropoxy moieties. However, other substituent groups can be present so long as the starting aromatic molecule meets the necessary definitions as herein stated.

The aromatic nucleus can be of a composite nature. In simple molecules it is a benzene nucleus. However, good results are obtained when employing an aminobiphenyl. Various isomeric such compounds are well known. Similarly, diaminobiphenyls are known and are used with good advantage. Also, mono- or diaminodiphenyl oxides are employed.

For reasons that are not well understood, it has proved to be unsatisfactory to halogenate the structure before introducing epoxy lower alkyl substituents upon the nitrogen. Therefore, in preparing the ar-nuclearly halogenated epoxy amines of this invention, the epoxy alkyl moiety is first introduced upon the nitrogen, and then halogenation is carried out.

This halogenation is carried out, in general, according to a method fully described in my copending application Ser. No. 524,833, now U.S. Pat. No. 3,426,035, filed Feb. 3, 1966; by reference I incorporate its teaching here.

In carrying out the present invention, the aromatic amine is dissolved or dispersed in solvent. Any inert solvent can be used, but the preferred solvent is epichlorohydrin which, at first, acts as solvent only. The exact amount of solvent relative to employed aromatic amine is not critical: when employing epichlorohydrin, a solvent amount is characteristically a stoichiometric excess in the epoxylation reaction. It is critical that during epoxylation such excess be present, and it is advantageous that it be a substantial excess.

Although not preferred, inert solvents that can be used include benzene, toluene, 1,1,1-trichloroethane, dichloropropane, dimethyl formamide, and the like.

Since it is later desired that water be present in the mixture but be subsequently removed, and in view of the fact that epichlorohydrin and water associate as an azeotrope, it is convenient and it is preferred to carry out the processes of the present invention in apparatus with condenser and water trap with return line for epichlorohydrin to bring it back to the reaction site. Also it is convenient to provide inlet facilities and the like with valve means: on a laboratory scale this is readily embodied in a funnel or thistle tube with stopcock.

Combining of epichlorohydrin and aromatic amine can take place preferably slowly, portionwise, and with stirring, or all at once. Combining is preferably carried out at ambient temperature, such as room temperature, but if desired it is successfully carried out at heated or at refrigerated temperatures.

Reaction between epichlorohydrin and aniline goes forward only very slowly at ambient or lower temperatures, but goes forward at a satisfactory rate at higher temperatures such as the boiling temperature of epichlorohydrin or above. Conveniently, the reaction is carried out at a temperature of from 50 to 117° C. and under reflux. At temperatures of 75° C. or above, the reaction goes forward at satisfactory rates.

Epichlorohydrine adds directly to amine nitrogen by molecular rearrangement and without by-product. Upon completion of the reaction the temperateure of the resulting mixture is conveniently permitted to equilibrate with room temperature, water is added, and halogen is then introduced, conveniently at a rate approximately that at which, by reaction, it is consumed.

Halogenation, and in particular bromination, of the products of the present invention reduces the flammability of both the uncured polyepoxide and of the cured resin prepared therefrom, and confers other desirable properties upon them. Choice of halogen is based in part upon cost factors but in part upon performance factors. It is usually preferred to brominate and to do so to the level of an average of from about ¼ to about 2 bromine substituents per aromatic nucleus. Larger or smaller relative amounts are at times preferred, and are easily employed.

Halogenation goes forward satisfactorily at temperatures over a wide range, and ambient temperature is satisfactory. Cooling may be needed to maintain the temperature.

Upon completion of halogenation it is preferred to remove most of the water that has been earlier added to promote halogenation, and then the mixture is treated to effect reconstitution of the oxirane rings. This cyclizing is readily carried out by the addition of aqueous alkali, such as a water solution of an alkali metal hydroxide. Unless particular by-products are sought, sodium hydroxide is preferred as cyclizing agent. The cyclizing reactions over all are of net exotherm and addition of cyclizing agent is conveniently carried out at such rate that reaction exotherm maintains the reaction mixture at boiling, whereby water is removed by distillation at approximately the rate at which, in aqueous caustic, it is added. As usual, epichlorohydrin removed as azeotrope is separated and returned to the reaction site.

The exact amount of cyclizing agent, such as sodium hydroxide, to be employed is not critical; but the stoichiometry of the cyclization reaction suggests the supplying of one mole of NaOH for each moietal weight of epoxyalkyl substituent to be formed in the cyclization. This stoichiometry, in turn, suggests that the reaction is favored by the employed of a modest excess, such as about a five to 100 mole weight percent excess by mole weight of epoxyalkyl groups. By the same line of reasoning, desirable amounts of other cyclizing agents are readily estimated.

Upon completion of cyclization the product is complete but it is usually much perffered to work it up by removal of extraneous materials. To this end, epihalohydrin is readily removed by distillation, the resulting product is taken up in an organic solvent that is not a solvent for halide of cyclization reaction, typically sodium chloride; filtered, and again distilled. Other work up can be employed.

The resulting polyepoxides, which are poly-1,2-lower alkane epoxides, are useful to be cured to obtain epoxy resins. Exact properties of the resins depend upon identity of the employed starting amine, identity and amount of halogen, and other similar factors. However, generally, the resins are stable as against crystallization in storage, of lower flammability than unhalogenated similar substances, readily cured to obtain epoxy resins that are also of reduced flammability, of excellent adhesive and electrical properties and highly resistant to failure through thermal change. They are stable against water and organic solvents.

The best modes now known to the invenrtor—but not the only ones—are as set forth in the following examples:

Example 1.—Into a 500 ml. three-necked flask equipped with stirrer, thermometer, reflux condenser with water trap having a return line for the lower, epichlorohydrin layer, and a bromine addition funnel were placed 46.5 grams (1 equivalent) of analine and 462.5 grams (5 moles) of epichlorohydrine. The mixture was heated, and the aniline and epichloorhydrin were allowed to react, at 80° C., for five hours. The solution was then cooled to room temperature and maintained at that temperature overnight. Water, 23.1 grams (5% based on the weight of epichlorohydrin) was added and 80 grams of bromine was then added dropwise over a period of 1.5 to 2 hours while maintaining the temperature at 24–26° C. After the bromine addition, the pot temperature was increased to 108° C. causing most of the water to distill off. The addition of 132 grams (110 weight percent of stoichiometric by weight of epoxy to be formed) of an aqueous 50 weight percent solution of sodium hydroxide was then begun, through a dropping funnel. The water content during the epoxylation reaction was kept at about 0.5 to 1.0%. Sodium hydroxide was added at a rate such that the amount of water azeotroped off with the epichlorohydrin was about equal to the water added with the hydroxide plus the water formed during the reaction. This was controlled by keeping the reaction temperature at 108° C., with a tolerance of one degree above or below. The water-epichlorohydrine mixture which azeotroped off was separated in the water trap and the epichlorohydrin returned to the reaction flask. All of the sodium hydroxide solution was added to the reaction mixture over a period of about two hours and the reaction was terminated. Unreacted epichlorohydrin (and, by now also some epibromohydrin) was distilled off to a temperature of about 130° C. and an absolute pressure of about 40 mm. An amount of toluene about equal to the volume of epihalohydrine removed was added to the residue. The toluene dissolved the desired resin but left sodium chloride of reaction as a residue. The salt was filtered out. The toluene was then distilled off to a temperature of about 150° C. at an absolute pressure of about 40 millimeters mercury. The resulting product was analyzed for many values. As representative analytical results the product was found to have an epoxy equivalent weight of about 164 as compared with a calculated weight of 142; bromine content of 27.1 percent by weight of product, and to be a 93.7 percent yield by weight of starting aniline.

Example 2.—When substantially the procedures of Example 1 are repeated, employing o-tetrtiarybutyl aniline (12 Beilstein 1166) as starting aromatic amine, the product is closely like that of Example 1; however, resins prepared by routine curing of the N,N-bis(epoxypropyl)-o-tertiarybutyl aniline product of this example are of inherently lower specific gravity than are similarly cured resins prepared from the product of Example 1.

Example 3.—This example is carried out substantially exactly as Example 1 except that the starting aromatic amine is methylenedianiline and weight amounts of reactants are modified to maintain the stoichiometry, and that the employed sodium hydroxide is 150% of the theoretically stoichiometric amount. The product is analyzed. Epoxy equivalent weight was 174.5, bromine constituted 22.4 percent by weight of product and yield was 93 percent based on starting methylenedianiline.

Example 4.—The present example differs from Example 3 in that the employed sodium hydroxide is 110% of the theoretical amount. Epoxy equivalent weight of product was 188, and yield 92.27 of theoretical based upon starting methylenedianiline.

Example 5.—In this example sodium hydroxide is employed in 112% of theoretical amount and bromination carried out at 35° C. Otherwise, Example 4 was followed. Epoxy equivalent weight was found upon analysis to be 180, bromine content 26.3 percent by weight of product, and yield 90.3 percent of theory, based on starting methylenedianiline.

Example 6.—Here, p-aminophenol is the starting aromatic amine, and one equivalent is employed, in five equivalents of epichlorohydrin; 0.67 equivalents of bromine are employed, followed by 113% of theoretical NaOH: epoxylation is carried out at 70° C. Otherwise, this example follows the procedures set forth in Example 1.

Analysis shows an epoxy equivalent weight of 191, bromine contents of 21.1% by weight of product, and yield 89% of theory based upon starting p-aminophenol.

Example 7.—In this example the starting aromatic amine is o-(2,3-epoxypropoxy)aniline: it is reacted with epichlorohydrin, brominated, and ring-closure is brought about with sodium hydroxide. Product is a mixture of arbrominated o-(2,3-epoxypropoxy)-N,N-bis(2,3 - epoxypropyl) aniline compounds having an average epoxy equivalent weight of approximately 115, indicating bromination to an average of somewhat more than one but not so many as two bromo substituents per molecule.

Example 8.—Into a 500 ml. three-necked flask on a balance and equipped with stirrer, thermometer, reflux condenser with water trap having a return line for the lower layer and a sparger tube connected to a cylinder of compressed chlorine also on a balance, were placed 49.5 grams (1.0 equivalent) of methylenedianiline as aromatic amine and 462.5 grams (5 moles) of epichlorohydrin. The amine and the epichlorohydrin were allowed to react at 80° C. for five hours. The solution was then cooled to room temperature and kept at the temperature overnight. Water 23.1 grams (5% based on the weight of epichlorohydrin) was added and chlorine sparged in at 65–85° C. temperature until the weight of the reaction vessel increased 35.5 grams (1 equivalent of chlorine). At the same time the weight of the chlorine cylinder decreased 45 grams. The chlorine addition took about 3.5 hours. The remainder of the reaction and work-up were carried out in a fashion identical with Example 1 except that sodium hydroxide was employed in the amount of 113% of theory.

Product had an epoxy equivalent weight of 188, 18.8% chlorine by weight of product, and yield was 103% of theory based on starting methylenedianiline.

Example 9.—Here the starting amine was p-aminophenol and procedures were substantially those of Example 8. Epoxy equivalent weight of product was found to be 180, chlorine (from an employed 0.66 equivalent weight) 11% against 11.35% theory, both as percent by weight of product, and a yield of 99.7% based upon starting p-aminophenol.

Example 10.—When Example 9 was repeated except that water to facilitate chlorination was supplied in the amount of only 5 percent of weight of epichlorohydrin and NaOH in cyclizing was supplied as 118% of theory, product contained 8.5% chlorine, had an epoxy equivalent weight of 152, and the yield was 86.4% of theory.

Example 11.—The procedures of Example 8 were repeated except that the aromaticamine was aniline and chlorination was carried out at 70°–80° C. Theoretical chlorine content of product was 14.7 weight percent; by analysis chlorine content was found to be 26.9%. Epoxy equivalent weight was 202, and yield based upon starting aniline was 100%.

Each of the above described products, and others tested for curability, are found to react and yield a cured epoxy resin. A cured product results, in each case, and the products are found to have very desirable properties, as noted.

I claim:
1. Process of making a product of the formula

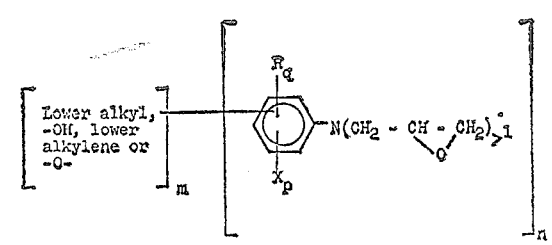

which comprises the steps of
(1) reacting an amino aromatic compound of the formula

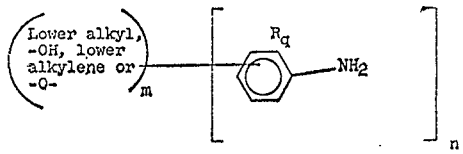

wherein
lower alkyl is alkyl of up to four carbon atoms;
$m$ is an integer, zero or one
X is chloro or bromo
$p$ is an integer from 1 to $[5-(q+m)]$;
R is a moiety

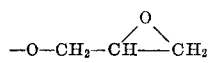

$q$ is an integer, zero to two with epichlorohydrin,
(2) halogenation with halogen X, and
(3) alkali induced closure to form the oxirane ring.
2. Process of claim 1 wherein the recited steps are carried out in epichlorohydrin as reaction solvent.

References Cited
UNITED STATES PATENTS

| | | | |
|---|---|---|---|
| 3,324,198 | 6/1967 | Gruver | 260—836 |
| 3,449,375 | 6/1969 | Newey | 260—348 |
| 2,951,825 | 9/1960 | Reinking et al. | 260—348X |
| 3,016,362 | 1/1962 | Wismer | 260—348X |
| 2,951,822 | 9/1960 | Reinking | 260—348X |
| 2,921,437 | 1/1960 | Andres et al. | 260—2 |
| 2,884,406 | 4/1959 | Wegler et al. | 260—47 |

FOREIGN PATENTS
1,132,148  6/1962  Germany.

NORMA S. MILESTONE, Primary Examiner

U.S. Cl. X.R.

260—2, 570, 574, 573